(12) United States Patent
Cao

(10) Patent No.: US 8,545,992 B2
(45) Date of Patent: Oct. 1, 2013

(54) ALUMINUM ARTICLE

(75) Inventor: Da-Hua Cao, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/474,828

(22) Filed: May 18, 2012

(65) Prior Publication Data

US 2013/0149550 A1 Jun. 13, 2013

(51) Int. Cl.
*B32B 15/04* (2006.01)
*B32B 15/20* (2006.01)

(52) U.S. Cl.
USPC ............ 428/652; 428/680; 428/215; 428/336

(58) Field of Classification Search
USPC .................. 428/650, 652, 674, 675, 678, 680, 428/428/212, 213, 214, 215, 220, 332, 334, 428/335, 336, 704
See application file for complete search history.

(56) References Cited

U.S. PATENT DOCUMENTS 4,981,741 A * 1/1991 Kawata et al. ............. 428/832.3

* cited by examiner

*Primary Examiner* — Michael La Villa
(74) *Attorney, Agent, or Firm* — Altis & Wispro Law Group, Inc.

(57) ABSTRACT

An aluminum article includes a substrate made of aluminum or aluminum alloy, a Ni—Cu—P alloy layer formed on the substrate, and a Ni—P alloy layer directly formed on the Ni—Cu—P alloy layer. The Ni—Cu—P alloy layer consists substantially of nickel, copper, and phosphorus and has a crystalline state. The Ni—P alloy layer consists substantially of nickel and phosphorus and has an amorphous structure. A method for making the aluminum article is also provided.

6 Claims, 8 Drawing Sheets

ALUMINUM ARTICLE

BACKGROUND

1. Technical Field

The disclosure generally relates to articles made from aluminum or aluminum alloy, and a method for making the articles.

2. Description of Related Art

Aluminum and aluminum alloy are used in manufacturing components of communication devices because of their desirable properties such as light weight, quick heat dissipation, and good conductivity. However, aluminum and aluminum alloy have relatively low erosion resistances. Portions of the aluminum or aluminum alloy are easily corroded (also known as pitting corrosion) in humid environments. The pitting corrosion can reduce the electromagnetic shielding capability of an aluminum component, possibly degrading communication functions of a communication device using the aluminum component.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure.

DETAILED DESCRIPTION

Figure 1:
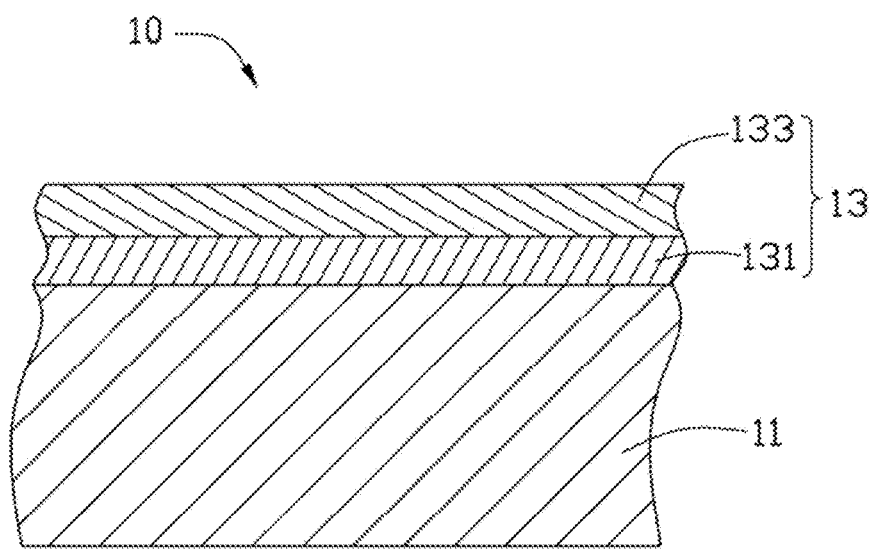
FIG. 1 is a cross-sectional view of an exemplary aluminum article.

FIG. 1 shows a cross-section of an exemplary aluminum article 10 including a substrate 11 and a composite coating 13 directly formed on the substrate 11.

The substrate 11 can be made of aluminum or aluminum alloy.

The composite coating 13 includes a Ni—Cu—P alloy layer 131 and a Ni—P alloy layer 133. The Ni—Cu—P alloy layer 131 is directly formed on the substrate 11. As used in this disclosure, "directly" means a surface of one layer is in contact with a surface of the other layer. The Ni—Cu—P alloy layer 131 consists substantially of nickel, copper, and phosphorus and has a crystalline structure. Within the Ni—Cu—P alloy layer 131, the nickel has a weight percentage from about 60% to about 75%; the copper has a weight percentage from about 23% to about 37%; the phosphorus has a weight percentage from about 1% to about 3%. The thickness of the Ni—Cu—P alloy layer 131 may be about 7.5 pm to about 8.5 μm. The Ni—P alloy layer 133 is directly formed on the Ni—Cu—P alloy layer 131. The Ni—P alloy layer 133 consists substantially of nickel and phosphorus and has an amorphous structure. Within the Ni—P alloy layer 133, the nickel has a weight percentage from about 88% to about 93%; the phosphorus has a weight percentage from about 7% to about 12%. The thickness of the Ni—P alloy layer 133 may be about 9 μm to about 11 μm. Both the Ni—Cu—P alloy layer 131 and the Ni—P alloy layer 133 can be formed by chemical plating (also known as electroless plating).

Figure 2:
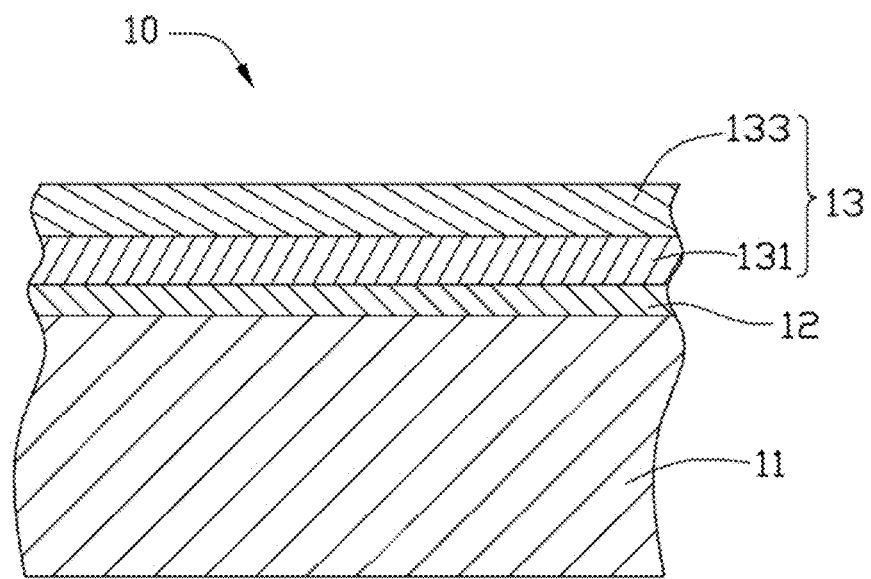
FIG. 2 is a cross-sectional view of another exemplary aluminum article.

Referring to FIG. 2, in another embodiment, to improve the adhesiveness of the composite coating 13, the aluminum article 10 may further include a nickel layer 12 located between the composite coating 13 and the substrate 12.

The composite coating 13 comprising the Ni—Cu—P alloy layer 131 and the Ni—P alloy layer 133 has the following advantages:

1. The high copper content within the Ni—Cu—P alloy layer 131 provides high conductivity for the composite coating 13; the nickel in the Ni—Cu—P alloy layer 131 is magnetic and provides good magnetism for the composite coating 13. Therefore, the composite coating 13 has a good electromagnetic shielding property.

2. The shielding efficiency (SE) against radio frequency (RF) transmission of a shield can be expressed as follows:

$$SE=A+R+B$$

wherein A is adsorption loss through the shield from conductivity and magnetic permeability of the shield; R is reflection loss caused by a sudden change in impedance encountered by the RF wave when it meets the side of the shield; B is multiple internal surface reflection correction term. In the case of the composite coating 13, the copper with a high content and the nickel cause a large adsorption loss A. Moreover, the Ni—Cu—P alloy layer 131 and the Ni—P alloy layer 133 have different impedances. Therefore, reflection loss R is created due to the sudden change in impedance from the Ni—Cu—P alloy layer 131 to the Ni—P alloy layer 133. As such, the composite coating 13 having a double-layered structure as Ni—Cu—P layer/Ni—P layer has a further improved electromagnetic shielding property.

3. The Ni—P alloy layer 133 which is amorphous has good corrosion resistance and abrasion resistance, providing the aluminum article 10 with good corrosion resistance and good abrasion resistance.

A method for manufacturing the aluminum article 10 mainly includes: providing the substrate 11; directly forming the Ni—Cu—P alloy layer 131 on the substrate 11 by chemical plating; and forming the Ni—P alloy layer 133 on the Ni—Cu—P alloy layer 131 by chemical plating.

Chemical plating the Ni—Cu—P alloy layer 131 may be carried out in a first plating bath containing about 20 g/L-25 g/L NiSO$_4$.6H$_2$O, about 2.0 g/L-2.5 g/L CuSO$_4$.5H$_2$O, about 20 g/L-25 g/L NaH$_2$PO$_2$.H$_2$O, about 20 g/L-30 g/L lactic acid, about 20 g/L-25 g/L sodium citrate, about 30 g/L-40 g/L sodium pyrophosphate, and about 0.1 g/L sodium dodecyl sulfate. The lactic acid, sodium citrate, Na$_4$P$_2$O$_7$, and sodium dodecyl sulfate are used as complexants. The first plating bath may have a pH value from about 8.5 to about 10.5 and in this embodiment it is from about 8.8 to about 9.0. The pH value can be adjusted using ammonia water. The temperature of the first plating bath is maintained at about 83° C. to about 87° C. during the chemical plating. The Ni—Cu—P alloy layer 131 obtained under the above conditions has a crystalline structure. A crystalline state of the Ni—Cu—P alloy layer 131 is best achieved with the pH value of the first plating bath is 8.5 or greater.

Chemical plating the Ni—P alloy layer 133 may be carried out in a second plating bath containing about 20 g/L-25 g/L NiSO$_4$.6H$_2$O, about 25 g/L-30 g/L NaH$_2$PO$_2$.H$_2$O, about 25 g/L-35 g/L lactic acid, about 15 g/L-20 g/L sodium citrate, and about 0.1 g/L sodium dodecyl sulfate. The second plating bath may have a pH value from about 4.5 to about 5.5. The pH value of the second plating bath can be adjusted using sodium hydroxide. The temperature of the second plating bath is maintained at about 81° C. to about 85° C. during the chemical plating.

In other embodiments, the method may further include chemical plating a nickel layer 12 on the substrate 11 before the step of chemically plating the Ni—Cu—P alloy layer 131. Chemical plating the nickel layer 12 may be carried out in a third plating bath containing about 0.02 mol/L-0.038 mol/L NiSO$_4$.6H$_2$O, about 0.20 mol/L-0.38 mol/L sodium citrate, and about 0.02 mol/L-0.038 mol/L potassium sodium tartrate. The third plating bath may have a pH value from about 10 to about 12. The pH value of the third plating bath can be adjusted using sodium hydroxide. The third plating bath is maintained at room temperature during the chemical plating.

The method may further include a step of pre-treating the substrate 11 before the chemical plating steps. The pretreatment may include:

a) degreasing: Commercial degreasing agent for aluminum alloy can be used.

b) a first activation: The substrate 11 may be immersed in a first activating solution prepared by hydrochloric acid and water at a ratio of about 1:4 by volume for about 6 second (s) to about 30 s. The first activating solution may be maintained at room temperature.

c) acid etching: The substrate 11 may be immersed in an etching agent consisting of nitric acid and water at a ratio of about 1:1 by volume for about 3 s to about 5 s. The etching agent may be maintained at room temperature.

d) a second activation: The substrate 11 may be immersed in a second activating solution containing 10% (by weight) sulphuric acid for about 50 s to about 60 s. The second activating solution may be maintained at room temperature.

Chemical plating the Ni—Cu—P alloy coating 131 uses a basic first plating bath (pH value in a range of 8.5-10.5). A basic plating bath aids in creating a nanocrystalline Ni—Cu—P alloy coating 131. Normally, a basic plating bath is unstable and easily hydrolyzed, therefore the first plating bath for chemical plating the Ni—Cu—P alloy coating 131 includes multiple complexants especially the sodium pyrophosphate having a strong complexing action, ensuring the stability of the basic first plating bath during the chemical plating. Moreover, a high CuSO$_4$.5H$_2$O content of about 2.0 g/L-2.5 g/L in the first plating bath is used, ensuring a copper-based Ni—Cu—P alloy coating 131 is created.

Figure 3:
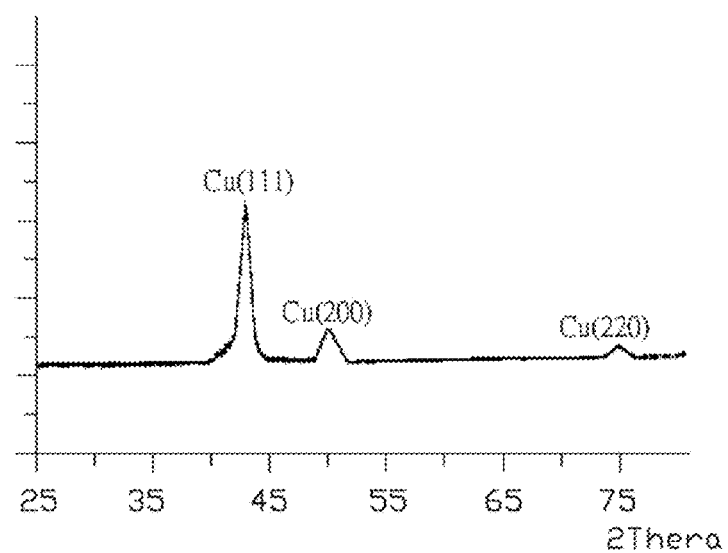
FIG. 3 is an X-ray diffraction pattern of a Ni—Cu—P alloy layer applied on an exemplary aluminum article.
Figure 4:
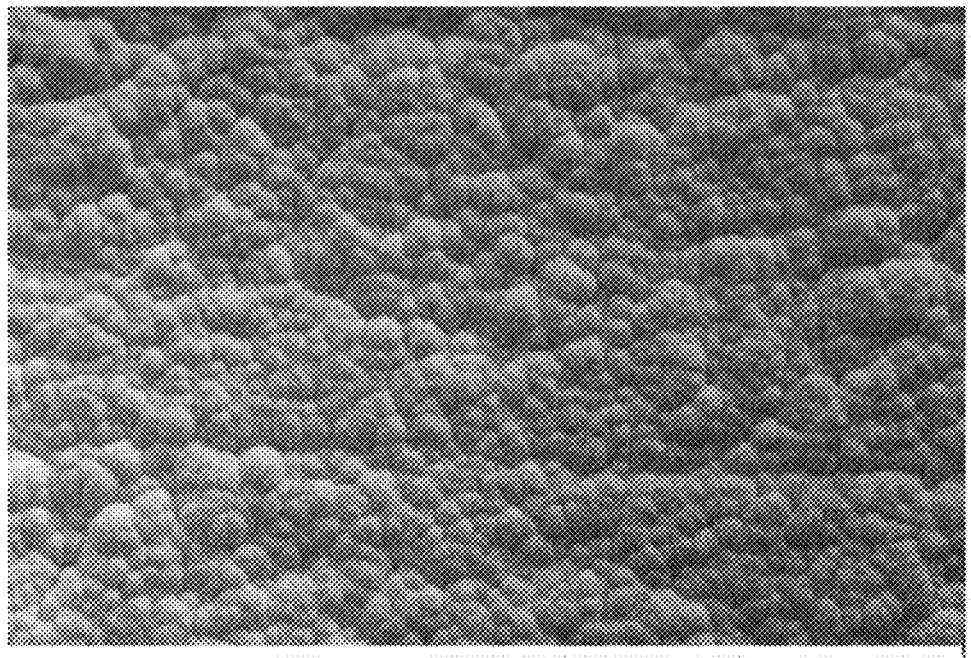
FIG. 4 is a stereoscan photograph (500× magnified) of a Ni—Cu—P alloy layer applied on an exemplary aluminum article.
Figure 5:
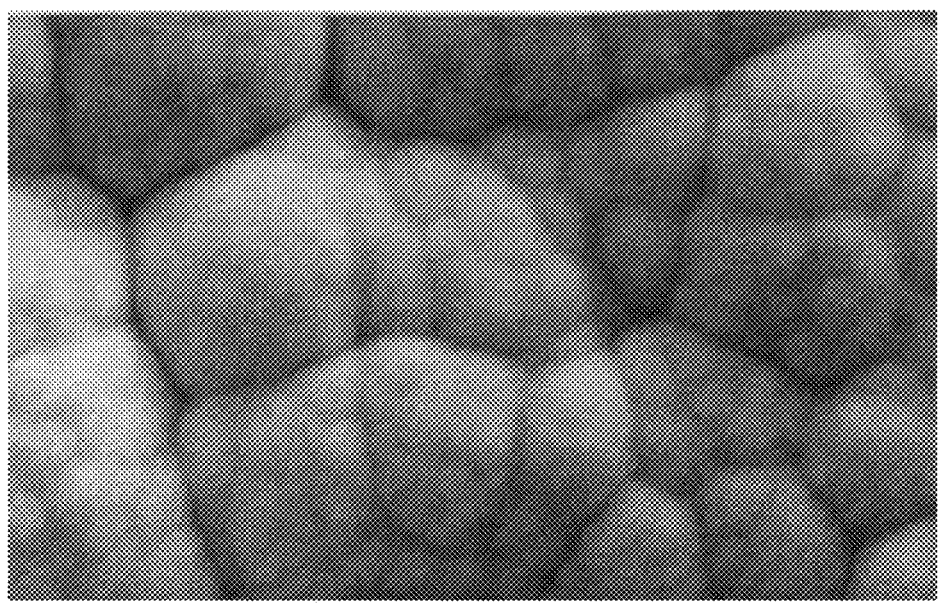
FIG. 5 is a stereoscan photograph (5000× magnified) of a Ni—Cu—P alloy layer applied on an exemplary aluminum article.

FIG. 3 shows an X-ray diffraction pattern of the Ni—Cu—P alloy layer 131 applied on an exemplary aluminum article manufactured by the present method. The X-ray diffraction pattern indicates that Ni—Cu—P alloy layer 131 has three diffraction peaks from the Cu(111), Cu(200), and Cu (220) faces respectively. But each diffraction peak is narrower than a corresponding diffraction peak of a copper crystal (diffraction peaks of a copper crystal are almost line-shaped), which is a characteristic of nanocrystalline structures. Referring to FIGS. 4 and 5, the stereoscan photographs of the Ni—Cu—P alloy layer 131 indicates that the Ni—Cu—P alloy layer 131 consists of a plurality of large cellular units and each cellular unit further consists of a plurality of small nano-sized cellular units, which is a surface topography characteristic of nanocrystalline structures. Such a nanocrystalline Ni—Cu—P alloy layer 131 has both good conductivity and good magnetic permeability, and therefore has improved electromagnetic shielding property.

Figure 6:
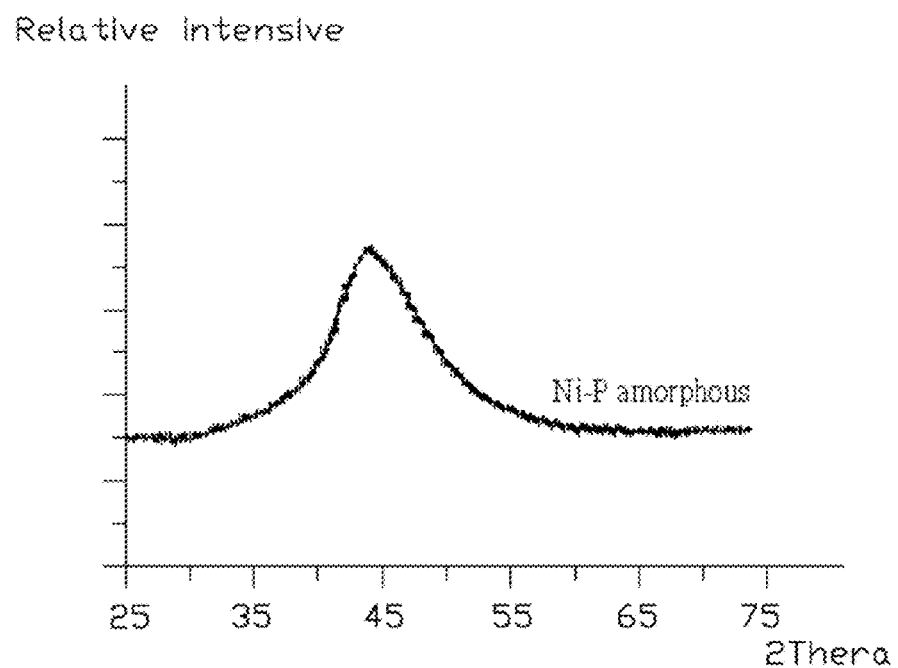
FIG. 6 is an X-ray diffraction pattern of a Ni—P alloy layer applied on an exemplary aluminum article.
Figure 7:
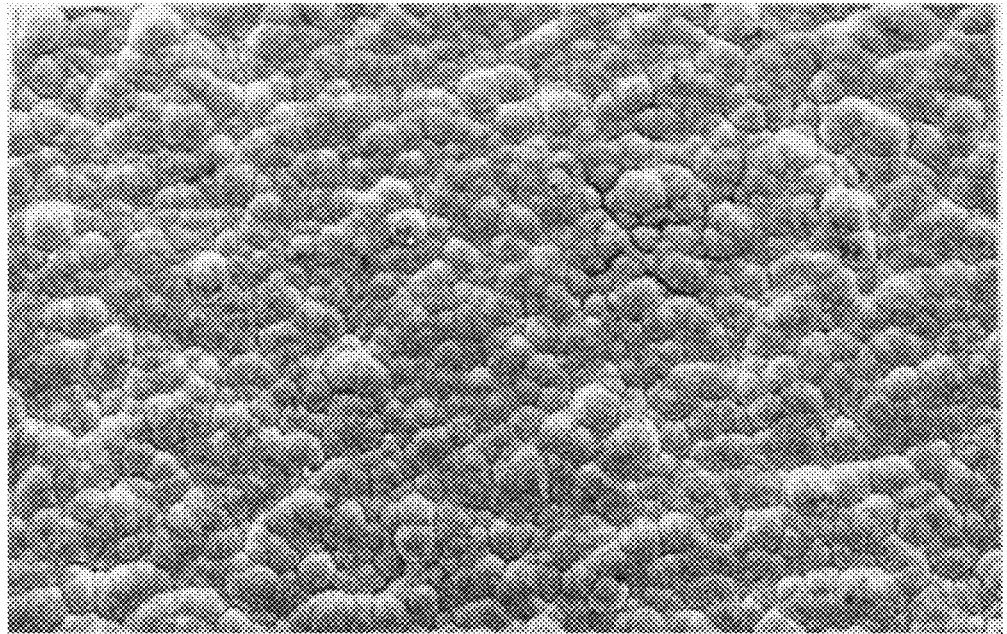
FIG. 7 is a stereoscan photograph (500× magnified) of a Ni—P alloy layer applied on an exemplary aluminum article.
Figure 8:
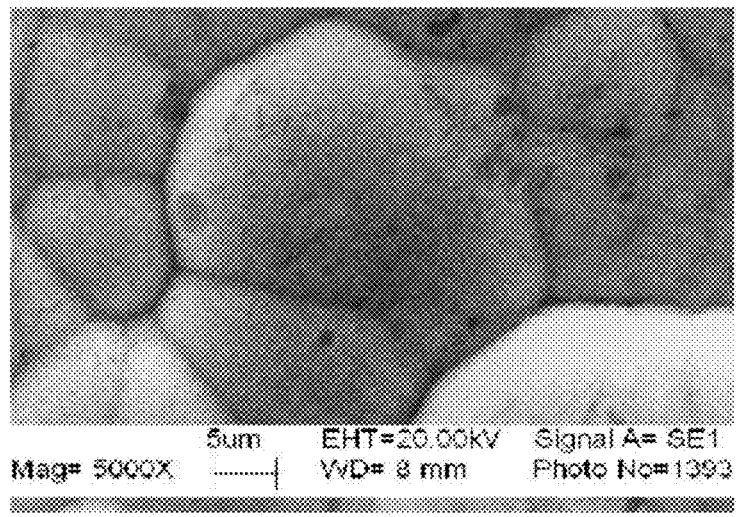
FIG. 8 is a stereoscan photograph (5000× magnified) of a Ni—P alloy layer applied on an exemplary aluminum article.

FIG. 6 shows an X-ray diffraction pattern of the Ni—P alloy layer 133 applied on an exemplary aluminum article manufactured by the present method. The X-ray diffraction pattern indicates that Ni—P alloy layer 133 has a widened diffraction peak from the Ni(111) face, which is a characteristic of amorphous structures. Referring to FIGS. 7 and 8, the stereoscan photographs of the Ni—P alloy layer 133 indicates that the Ni—P alloy layer 133 consists of a plurality of clear cellular units and the cellular units are very compactly arranged, which is a surface topography characteristic of amorphous structures. Such an amorphous Ni—P alloy layer 133 has no grain boundary and therefore has improved corrosion resistance.

EXAMPLES

Experimental examples of the present disclosure are described as follows.

Example 1

1. A sample S1 of aluminum alloy substrate was pretreated as according to the following steps.

a) degreasing: The substrate was immersed in a degreasing agent containing 30 g/L Na$_3$PO$_4$, 25 g/L Na$_2$CO$_3$, and 8 g/L Na$_2$SiO$_3$ for about 2 minutes. The degreasing agent was maintained at a temperature of about 70° C.-75° C.

b) a first activation: The substrate was immersed in a first activating solution prepared by mixing hydrochloric acid and water at a ratio of about 1:4 by volume for about 10 s.

c) acid etching: The substrate 11 was immersed in an etching agent prepared by mixing nitric acid and water at a ratio of about 1:1 by volume for about 3 s.

d) a second activation: The substrate 11 was immersed in a second activating solution containing 10% (by weight) sulphuric acid for about 50 s.

2. chemical plating a nickel layer on the substrate: The plating bath for chemical plating the nickel layer contained about 0.025 mol/L NiSO$_4$.6H$_2$O, about 0.25 mol/L sodium citrate, and about 0.03 mol/L potassium sodium tartrate. The plating bath had a pH value of about 10.

3. chemical plating a Ni—Cu—P alloy layer: The plating bath for chemical plating the Ni—Cu—P alloy layer contained about 21 g/L NiSO$_4$.6H$_2$O, about 2.2 g/L CuSO$_4$.5H$_2$O, about 20 g/L NaH$_2$PO$_2$.H$_2$O, about 25 g/L lactic acid, about 24 g/L sodium citrate, about 35 g/L sodium pyrophosphate, and about 0.1 g/L sodium dodecyl sulfate. The plating bath had a pH value from about 8.9 to about 9.0 and was maintained at about 83° C. to about 87° C. Chemical plating the Ni—Cu—P alloy layer took about 50 minutes and the thickness of the Ni—Cu—P alloy layer was about 8 μm.

4. chemical plating a Ni—P alloy layer: The plating bath for chemical plating the Ni—P alloy layer contained about 20 g/L NiSO$_4$.6H$_2$O, about 25 g/L NaH$_2$PO$_2$.H$_2$O, about 30 g/L lactic acid, about 15 g/L sodium citrate, and about 0.1 g/L sodium dodecyl sulfate. The plating bath had a pH value from about 4.5 to about 5.5 and was maintained at about 81° C. to about 85° C. Chemical plating the Ni—P alloy layer took about 60 minutes and the thickness of the Ni—P alloy layer was about 10 μm.

Example 2

1. A sample S2 of aluminum alloy substrate was pretreated. The pretreatment was conducted the same as the example 1.

2. chemical plating a nickel layer on the substrate: The plating bath for chemical plating the nickel layer contained about 0.03 mol/L $NiSO_4 \cdot 6H_2O$, about 0.3 mol/L sodium citrate, and about 0.035 mol/L potassium sodium tartrate. The plating bath has a pH value of about 11.

3. chemical plating a Ni—Cu—P alloy layer: The plating bath for chemical plating the Ni—Cu—P alloy layer contained about 25 g/L $NiSO_4 \cdot 6H_2O$, about 2.4 g/L $CuSO_4 \cdot 5H_2O$, about 23 g/L $NaH_2PO_2 \cdot H_2O$, about 30 g/L lactic acid, about 20 g/L sodium citrate, about 40 g/L sodium pyrophosphate, and about 0.1 g/L sodium dodecyl sulfate. The plating bath had a pH value from about 8.9 to about 9.0 and was maintained at about 83° C. to about 87° C. Chemical plating the Ni—Cu—P alloy layer took about 50 minutes and the thickness of the Ni—Cu—P alloy layer was about 8.2 μm.

4. chemical plating a Ni—P alloy layer: The plating bath for chemical plating the Ni—P alloy layer contained about 20 g/L $NiSO_4 \cdot 6H_2O$, about 28 g/L $NaH_2PO_2 \cdot H_2O$, about 30 g/L lactic acid, about 20 g/L sodium citrate, and about 0.1 g/L sodium dodecyl sulfate. The plating bath had a pH value from about 4.5 to about 5.5 and was maintained at about 81° C. to about 85° C. Chemical plating the Ni—P alloy layer took about 60 minutes and the thickness of the Ni—P alloy layer was about 9.5 μm.

Example 3

1. A sample S3 of aluminum alloy substrate was pretreated. The pretreatment was conducted the same as the example 1.

2. chemical plating a nickel layer on the substrate: The plating bath for chemical plating the nickel layer contained about 0.035 mol/L $NiSO_4 \cdot 6H_2O$, about 0.35 mol/L sodium citrate, and about 0.032 mol/L potassium sodium tartrate. The plating bath had a pH value of about 12.

3. chemical plating a Ni—Cu—P alloy layer: The plating bath for chemical plating the Ni—Cu—P alloy layer contained about 23 g/L $NiSO_4 \cdot 6H_2O$, about 2.3 g/L $CuSO_4 \cdot 5H_2O$, about 25 g/L $NaH_2PO_2 \cdot H_2O$, about 20 g/L lactic acid, about 25 g/L sodium citrate, about 30 g/L sodium pyrophosphate, and about 0.1 g/L sodium dodecyl sulfate. The plating bath had a pH value from about 8.9 to about 9.0 and was maintained at about 83° C. to about 87° C. Chemical plating the Ni—Cu—P alloy layer took about 50 minutes and the thickness of the Ni—Cu—P alloy layer was about 7.8 μm.

4. chemical plating a Ni—P alloy layer: The plating bath for chemical plating the Ni—P alloy layer contained about 25 g/L $NiSO_4 \cdot 6H_2O$, about 30 g/L $NaH_2PO_2 \cdot H_2O$, about 35 g/L lactic acid, about 20 g/L sodium citrate, and about 0.1 g/L sodium dodecyl sulfate. The plating bath had a pH value from about 4.5 to about 5.5 and was maintained at about 81° C. to about 85° C. Chemical plating the Ni—P alloy layer took about 60 minutes and the thickness of the Ni—P alloy layer was about 10.2 μm.

Results

The shielding efficiencies of the samples S1-S3 were tested using a frequency spectrometer (type: E5071C, provided by Agilent Ltd). The results indicated that, in the range between about 100 KHz and about 4.5 GHz, the shielding efficiencies for the samples S1-S3 were 100 dB, 105 dB, and 110 dB, respectively. In the range between about 10 Hz and about 10 KHz, the shielding efficiencies for the samples S1-S3 were 60 dB, 63 dB, and 65 dB respectively. However, it has been commonly recognized simple aluminum material without the Ni—Cu—P alloy layer and the Ni—P alloy layer had a very low shielding efficiency at low frequency and even had no shielding efficiency at a frequency below 50 Hz.

Moreover, the corrosion resistances of the samples S1-S3 were tested. The test was conducted by immersing the samples S1-S3 in a 5% (by weight) NaCl solution for about 12 days, and inspecting the samples every 4 days. The results showed that, none of the samples S1-S3 had pitting corrosion after 8 days. After 12 days, the sample S1 had one point of pitting corrosion; the samples S2 and S3 had no pitting corrosion, indicating the samples S1-S3 have high corrosion resistances.

It is to be understood, however, that even through numerous characteristics and advantages of the exemplary disclosure have been set forth in the foregoing description, together with details of the system and functions of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An aluminum article, comprising:
a substrate made of aluminum or aluminum alloy;
a Ni—Cu—P alloy layer formed on the substrate, the Ni—Cu—P alloy layer consisting of nickel, copper, and phosphorus and having a crystalline state;
a Ni—P alloy layer directly formed on the Ni—Cu—P alloy layer, the Ni—P alloy layer consisting of nickel and phosphorus and having an amorphous state.

2. The aluminum article as claimed in claim 1, wherein within the Ni—Cu—P alloy layer, the nickel has a weight percentage from about 60% to about 75%; the copper has a weight percentage from about 23% to about 37%; the phosphorus has a weight percentage from about 1% to about 3%.

3. The aluminum article as claimed in claim 1, wherein the thickness of the Ni—Cu—P alloy layer is about 7.5 μm to about 8.5 μm.

4. The aluminum article as claimed in claim 1, wherein within the Ni—P alloy layer, the nickel has a weight percentage from about 88% to about 93%; the phosphorus has a weight percentage from about 7% to about 12%.

5. The aluminum article as claimed in claim 1, wherein the thickness of the Ni—P alloy layer is about 9 μm to about 11 μm.

6. The aluminum article as claimed in claim 1, further comprising a nickel layer located between the Ni—Cu—P alloy layer and the substrate.

* * * * *